March 26, 1935.   C. G. BIGELOW ET AL   1,995,465
STIRRING TANK
Filed Nov. 4, 1933   3 Sheets-Sheet 1

Inventors
Charles G. Bigelow
Wilfred C. Schofield
attys.

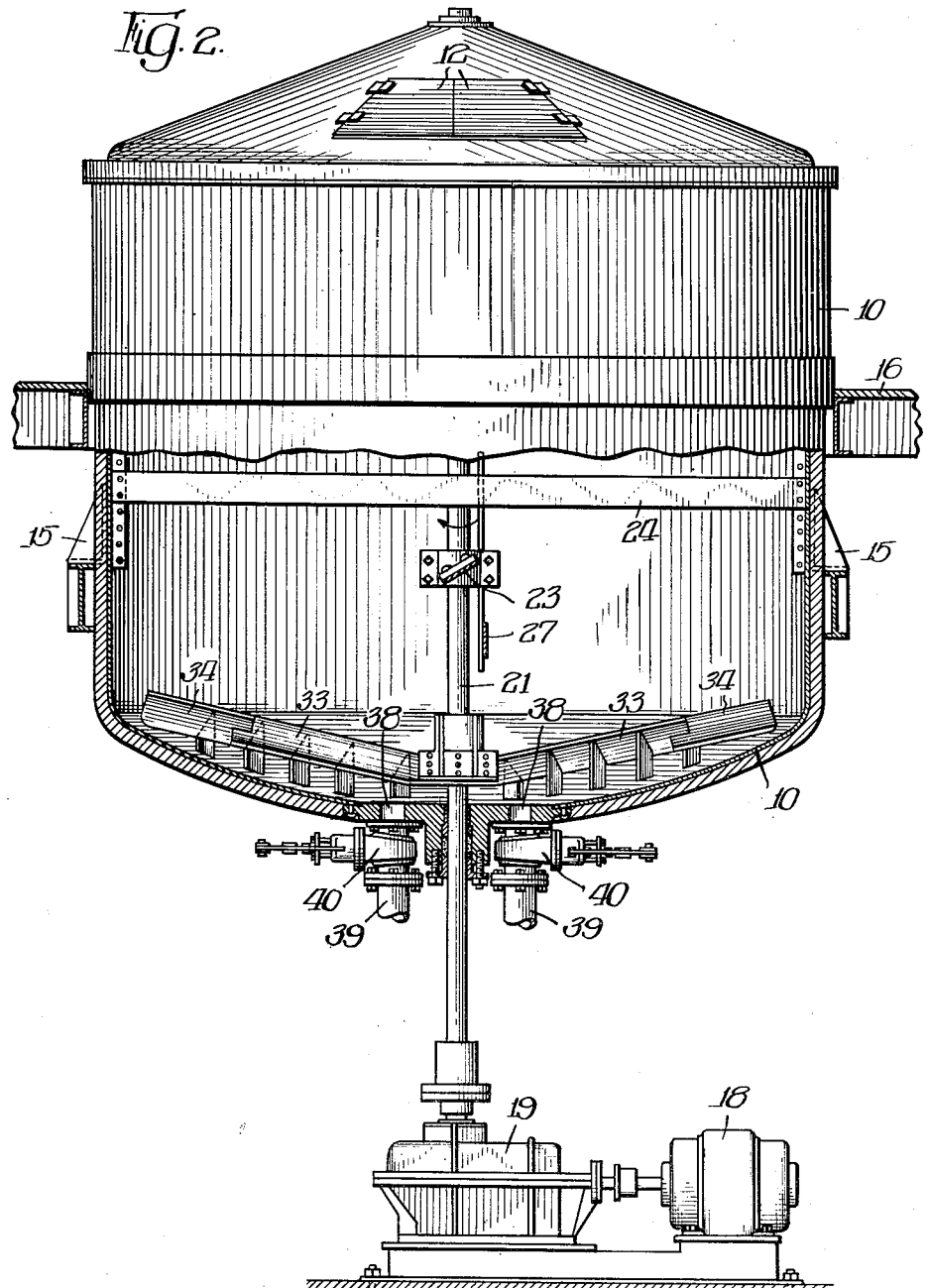

March 26, 1935.  C. G. BIGELOW ET AL  1,995,465
STIRRING TANK
Filed Nov. 4, 1933  3 Sheets-Sheet 3
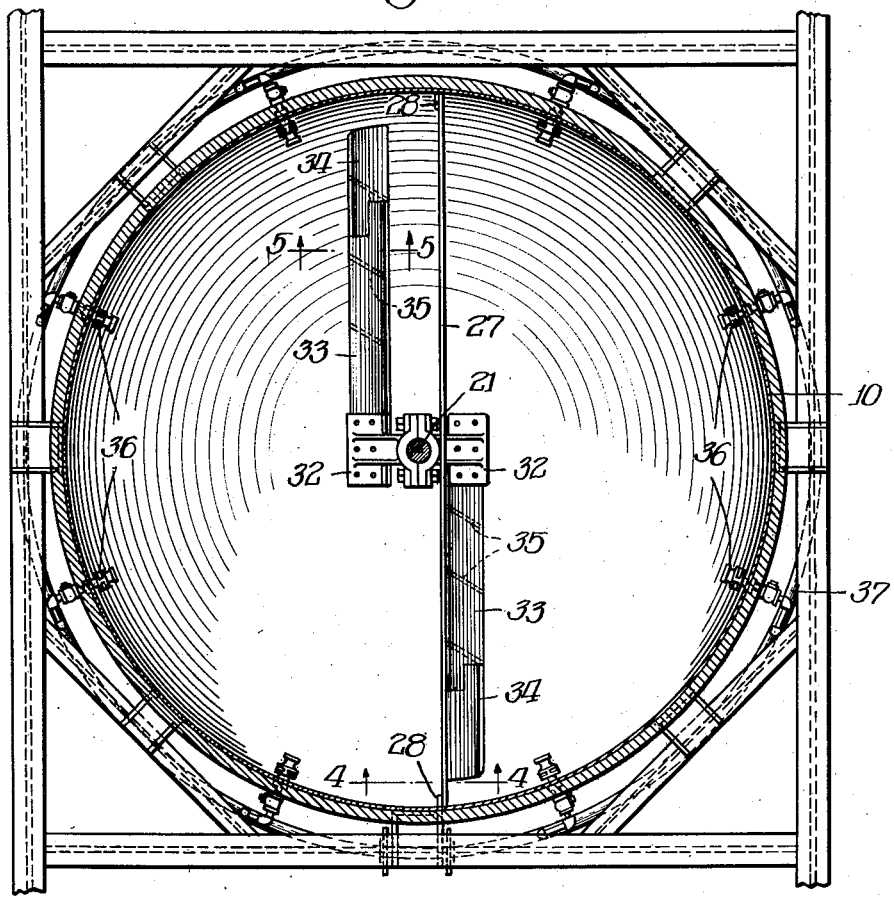
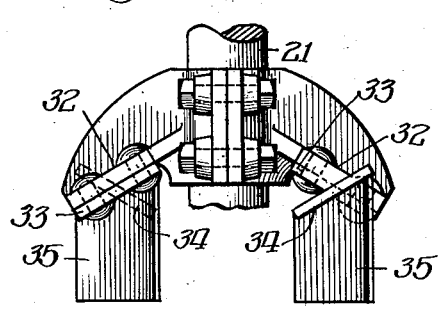
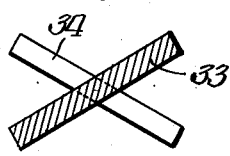
Inventors:
Charles G. Bigelow
Wilfred C. Schofield Patented Mar. 26, 1935

1,995,465

UNITED STATES PATENT OFFICE 1,995,465

STIRRING TANK

Charles G. Bigelow and Wilfred C. Schofield, Chicago, Ill., assignors to Freyn Engineering Company, Chicago, Ill., a corporation of Maine Application November 4, 1933, Serial No. 696,664

4 Claims. (Cl. 259—108)

The present invention relates to stirring tanks.

The present invention will be described in connection with mash tanks such as are used in the brewing industry. As the description proceeds, however, it will be apparent that the invention is not limited to mash tanks but has a broader application. Referring for the purpose of illustration, however, to mash tanks, it may be stated that means should be provided for thoroughly stirring the mash within the tank and for expediting the delivery of the mash from the tank.

An object of the present invention is to provide a stirring tank of simple and sturdy construction provided with improved stirring means for insuring the intimate contact of water or other liquid with the grain or other material within the tank.

A further object is to provide a stirring tank provided with stirring means for setting up a circulation of the material within the tank, which circulation will insure relative movement between the various particles of the material within the tank, whereby an efficient stirring operation may be accomplished.

Further objects will appear as the description proceeds.

Referring to the drawings—

Figure 2 is a longitudinal sectional view of a modification but illustrating a bottom drive for the stirring mechanism;

Figure 3 is a longitudinal sectional view taken along the plane indicated by the arrows 3—3 of Figure 1;

Figure 4 is a view in elevation of the stirring mechanism illustrated in Figure 3, the structure of Figure 4 being taken in the direction of the arrows 4—4 of Figure 3; and Figure 5 is a sectional view taken along the arrows 5—5 of Figure 3.

Figure 1:
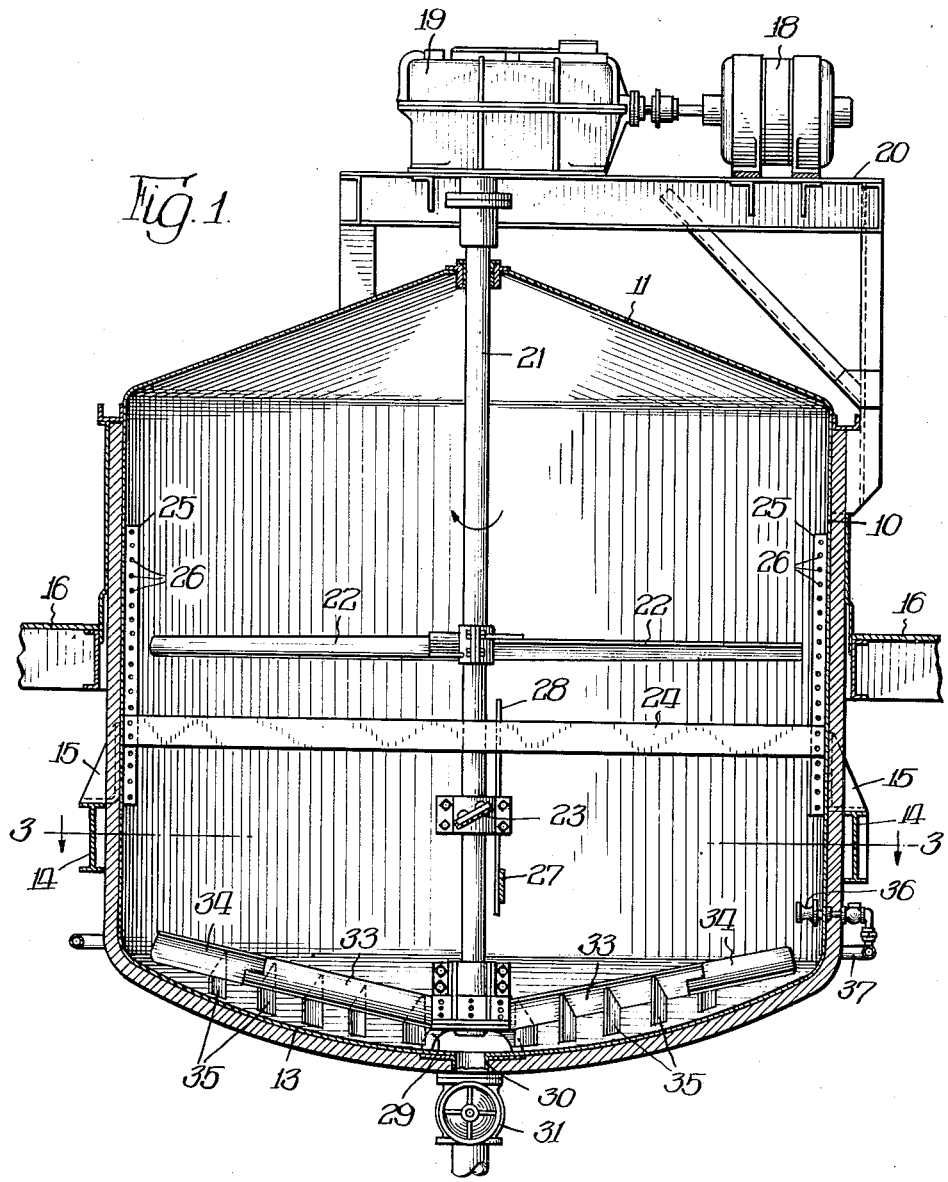
Figure 1 is a vertical sectional view illustrating one embodiment of the present invention, said view illustrating a top drive for the stirring mechanism.

The numeral 10 indicates a tank which is cylindrical in horizontal cross section. The tank chosen for illustration has the conical top portion 11, which, as shown in Figure 2, is provided with doors 12—12 for the entry of grain or other material. The bottom wall 13 of the tank 10 is dished, the axial portion of said bottom wall 13 being lowermost. The tank 10 may be supported upon the structural steel members 14—14, said structural steel members providing supports for brackets 15—15, which are secured to the cylindrical wall of the tank 10. Flooring material 16 may be provided adjacent to the tank whereby the operators may have ready access to the doors 12—12. The construction illustrated in Figure 1 includes a top drive for the stirring mechanism, which is located within the tank 10 and which will be described presently.

The driving mechanism shown in Figure 1 includes a motor 18 and a gear reduction mechanism 19, both of which are carried by framework indicated by the numeral 20. Said framework 20 may be supported by any preferred means. Cooperatively associated with the gear reduction mechanism 19 is the vertically disposed shaft 21. It will be understood that end thrust mechanism will be provided for taking the downward thrust set up by the shaft 21 and the stirring mechanism carried thereby.

Fixedly mounted upon the shaft 21 are a pair of paddles or impellers 22—22, said paddles being so turned relative to a horizontal plane that when the shaft 21 is revolved in a clockwise direction looking downwardly along said shaft, each of said paddles will have a tendency to exert a downward force upon material within said tank engaged by said paddles. Also disposed upon the shaft 21 at a lower level are the paddles or impellers 23—23. The paddles or impellers 23—23 are disposed in vertical radial planes spaced midway between the vertical radial planes which are the loci of the paddles or impellers 22—22. Said paddles or impellers 23—23 are turned oppositely with respect to the paddles or impellers 22—22, whereby when the shaft 21 is turned in a clockwise direction as the parts are viewed looking down said shaft, said paddles or impellers 23—23 tend to exert an upward force upon the material within the tank 10.

Disposed below the paddles 22—22 is the adjustable breaker bar 24, which breaker bar extends across the tank 10 at a region near to the diameter of said tank 10. Said breaker bar 24 is carried by the two oppositely disposed radial flanges 25—25. Said flanges 25—25 are provided with a plurality of longitudinal, equi-spaced holes 26—26. The breaker bar 24 is provided adjacent to its extremities with holes corresponding to the holes 26—26 whereby the bars 24—24 may be conveniently disposed at the desired level.

Below the paddles 23—23 is a breaker bar 27, disposed in a plane substantially at right angles to the vertical plane in which the breaker bar 24 is disposed. Said breaker bar 27 is carried by a pair of longitudinally disposed flanges 28—28, only one of which appears in Figure 1.

The shaft 21 is held against side sway at its bottom extremity by means of a spider 29. Said spider 29 may have only three legs which permit ready access from the interior of the tank 10 to the outlet pipe 30. Said outlet pipe 30 is controlled by means of the valve 31. Said spider 29 may be welded or otherwise secured to the bottom of the tank 10 and provides a collar for receiving the lower extremity of the shaft 21 to take up side thrust which might tend to cause a swaying movement in the lower extremity of said shaft 21.

Carried by the shaft 21 adjacent to its lower extremity are a pair of oppositely disposed agitator bars 32—32. Each of said agitator bars 32 comprises a paddle portion 33 inclined relative to a horizontal plane in a direction to exert a downward force upon the material within the tank 10 when the shaft 21 is turned in a clockwise direction looking downwardly along said shaft. Disposed at the outer extremity of the paddle portion 33 is the paddle portion 34 also inclined relative to a horizontal plane. The inclination of the paddle portion 34 is opposite to the paddle portion 33, whereby when the shaft 21 is turned in the direction above referred to, the paddle portion 34 of each agitator 32 will tend to exert an upward thrust on the material within the tank 10.

It will be observed that as the shaft 21 is turned, the thrusts imparted to the paddles or impellers 22—22 will be opposite to the thrusts imparted to the paddles or impellers 23—23. Furthermore, the longitudinal thrusts imparted to the paddle portion 33 of each agitator bar 32 will be opposite to the longitudinal thrust imparted to the paddle portion 34 of the same agitator bar. The effect of end thrust upon the shaft 21 is thereby reduced to a minimum.

Extending downwardly from the paddle portions 33 and 34 of the agitator bars 32 are a plurality of blades or vanes 35, which, as the shaft 21 is turned in a clockwise direction (looking downwardly upon said shaft), exert a force upon the material at the bottom of the tank 10, tending to move said material from the axis of the tank 10 toward the periphery thereof.

The numerals 36—36 indicate a plurality of steam nozzles which may be supplied by the pipe 37 for delivering steam to the interior of the tank 10.

The construction illustrated in Figure 2 is in most respects similar to the construction above described. In Figure 2 the shaft 21 is driven from below the tank 10, the center of the lower wall 13 of the tank 10 being provided with an aperture to permit the passage of said shaft 21, suitable packing glands being provided to prevent the escape of fluid downwardly along said shaft 21. Disposed in spaced relationship with the shaft 21 are a plurality of outlet apertures 38—38 each leading to an outlet pipe 39. Each outlet pipe has therein a valve 40 for controlling the delivery of material from the tank 10.

It will be understood without detailed explanation that when the tank 10 is filled with material to the desired level and a turning movement is communicated to the shaft 21, circulation will be set up within said material. Assuming clockwise rotation of the shaft 21 as the parts are viewed looking downwardly along said shaft, the impellers or paddles 22 will exert a downward force upon said material, whereas the paddles 23 arranged in vertical radial planes intermediate of the vertical radial planes containing the impellers or paddles 22 will impart an upward thrust to such material. The breaker bars 24 and 27 will set up further swirls or eddy currents within the material, and the agitators 32—32, which include the oppositely inclined paddle portions 33 and 34 and the vanes 35—35, will exert a downward pull upon the material near the axis of the tank 10, an outward thrust upon said material and an upward push upon said material adjacent to the periphery of the tank. Thorough agitation of the grain or other material and the water or other liquid within the tank will be accomplished. When it is desired to draw off the material from within the tank 10, the valve 31 will be opened (in the construction shown in Figure 1) or the valves 40—40 will be opened (in the construction shown in Figure 2), whereby the material may be readily drawn off.

Though certain preferred embodiments of the present invention have been described in detail, many modifications will occur to those skilled in the art. It is intended to cover all such modifications that fall within the scope of the appended claims.

What is claimed is—

1. In a stirring tank, in combination, a cylindrical vessel, a rotatable shaft axially disposed within said vessel, an even number of vertically spaced impellers carried by said shaft for stirring material within said tank, certain of said impellers being inclined in one direction and an equal number being inclined in the opposite direction, and agitator bars carried by said shaft at the bottom of said tank, said bars having portions thereof inclined to a plane normal to said shaft and having other portions inclined oppositely to the first-mentioned portions of said agitator bars.

2. In a stirring tank, in combination, a cylindrical vessel, a rotatable shaft axially disposed within said vessel, an even number of vertically spaced impellers carried by said shaft for stirring material within said tank, certain of said impellers being inclined in one direction and an equal number being inclined in the opposite direction, and agitator bars carried by said shaft at the bottom of said tank, said bars having portions thereof inclined to a plane normal to said shaft and having other portions inclined oppositely to the first-mentioned portions of said agitator bars, said agitator bars having vanes extending downwardly therefrom for exerting a thrust in a radial direction to material within said vessel.

3. In a stirring tank, in combination, a cylindrical vessel, a rotatable shaft axially disposed within said vessel, an even number of vertically spaced impellers carried by said shaft for stirring material within said impellers, certain of said impellers being inclined in one direction and an equal number being inclined in the opposite direction, breaker bars disposed transversely of said vessel, and agitator bars carried by said shaft disposed adjacent to the bottom of said tank, each of said agitator bars having a portion adjacent to said shaft inclined with respect to a plane normal to said shaft, each of said agitator bars having an outer portion inclined oppositely to the inclination of said first-mentioned portion.

4. In a stirring tank, in combination, a cylindrical vessel, a rotatable shaft axially disposed within said vessel, an even number of vertically spaced impellers carried by said shaft for stirring material within said impellers, certain of said impellers being inclined in one direction and an equal number being inclined in the opposite direction, breaker bars disposed transversely of said vessel, and agitator bars carried by said shaft disposed adjacent to the bottom of said tank, each of said agitator bars having a portion adjacent to said shaft inclined with respect to a plane normal to said shaft, each of said agitator bars having an outer portion inclined oppositely to the inclination of said first-mentioned portion, each of said agitator bars having vanes extending therefrom adjacent to the bottom of said tank for setting up a radial thrust upon the material within said tank when said shaft is turned.

CHARLES G. BIGELOW.
WILFRED C. SCHOFIELD.